United States Patent [19]
Hebert

[11] Patent Number: 5,149,438
[45] Date of Patent: Sep. 22, 1992

[54] METHOD FOR MAGNETICALLY TREATING WATER IN A CLOSED LOOP HEAT TRANSFER SYSTEM

[76] Inventor: Claude L. Hebert, 340 Boulevard Mortagne, Boucherville, Quebec, Canada, J4B 1B5

[21] Appl. No.: 713,168

[22] Filed: Jun. 11, 1991

[30] Foreign Application Priority Data
Jun. 18, 1990 [CA] Canada ............................ 2019185

[51] Int. Cl.⁵ .............................................. C02F 1/48
[52] U.S. Cl. .................................. 210/695; 210/167; 210/181; 210/195.1; 210/223; 210/805
[58] Field of Search ............ 210/167, 175, 181, 195.1, 210/222, 223, 695, 805; 122/379, 396, 398; 165/119

[56] References Cited
U.S. PATENT DOCUMENTS

| | | | |
|---|---|---|---|
| 1,762,784 | 6/1930 | Kriegsheim | 210/167 |
| 1,831,075 | 11/1931 | Neeley | 210/223 |
| 4,406,794 | 9/1983 | Brigante | 210/222 |
| 4,999,106 | 3/1991 | Schinder | 210/222 |

Primary Examiner—Robert A. Dawson
Assistant Examiner—Matthew O. Savage
Attorney, Agent, or Firm—Watson, Cole, Grindle & Watson

[57] ABSTRACT

There is provided a method and apparatus for treating water used in heat exchange operations such as boilers wherein the water is subjected to a magnetic conditioning prior to being used in the heat exchange operation and is subsequently filtered to remove larger particles while permitting smaller particles to remain in suspension.

11 Claims, 1 Drawing Sheet

5,149,438

METHOD FOR MAGNETICALLY TREATING WATER IN A CLOSED LOOP HEAT TRANSFER SYSTEM

BACKGROUND OF THE INVENTION

The present invention relates to a method and apparatus for treating fluids and more particularly, it relates to a method and apparatus suitable for treating water used in industrial processes and particularly heat exchange operations.

It has long been recognized that water used for heat exchange operations in industrial and commercial processes needs to be treated to remove or control impurities, especially the salts of calcium and magnesium, which can cause scaling in heat transfer operations such as in boilers. Over the years, a number of methods have been practiced with varying degrees of success. Widely used are chemical methods and there are now relatively high efficiency processes using precipitation and ion exchange. These treatments are performed before the water has reached its location of usage and thus it is an external treatment process. Although these processes can reduce the residual hardness scales of the water, the extreme operating conditions of modern industrial operations are such that the external treatment cannot completely prevent the problems associated with hard water. Accordingly, there are also a variety of internal chemical treatments available and which are also widely used in the industry.

Most water from naturally occuring ground and surface supplies will contain a variety of dissolved minerals and impurities and the amount will reflect the hardness of the dissolved materials. When these waters are used in heat transfer equipment such as boilers, scale builds up on the surfaces causing many problems. As a result, one can encounter a lower efficiency due to reduced heat transfer. In addition, the scale can cause damage to the equipment especially those operating under higher temperatures and pressures. These problems can in turn cause leakages and burn out of the heating devices as well as leading to possible damage to the boiler itself. Even when the water as a whole is not of excessive hardness, scale deposits can still form since a thin film of water directly adjacent to the heating surface tends to become concentrated in hardness salts and their crystallisation and baking into place directly on the heating surface can occur.

A second problem associated with heat exchange operations such as boilers is corrosion. Although scale does not directly aggravate corrosion of boiler plates and/or tubes, it is a problem in that it can make corroded surfaces more difficult to detect as well as trapping chemicals of a corrosive nature in an area where their action may continue for some time.

The problems of scale and corrosion are complex ones in that steps followed to minimize scale formation can sometimes lead to increased corrosion problems. Especially at elevated temperatures, a higher pH is required to prevent corrosion and in such cases, addition of chemicals is required. However, to minimize scale formation, frequent blow down of the boilers is required and this merely augments the total amount of chemicals required and increases the operational costs for the system.

SUMMARY OF THE INVENTION

It is an object of the present invention to provide a method and apparatus for the treatment of water used in a heat exchange operation wherein the system is of the closed loop type, the method and apparatus being effective to minimize scaling and corrosion problems associated with the use of hard water.

According to the method of the present invention, there is provided a method for the treatment of water used in a heat exchange operation and wherein the operation is at least partially of a closed loop type. The method includes the steps of passing said water through a magnetic field which generates magnetic flux, the water being passed through the magnetic flux to cut the lines of flux at a substantially large angle and permitting said water to be exposed to sufficient flux lines for a period of time sufficient to permit said flux lines to act on particles in the water, directing said magnetically treated fluid into a heat exchange operation, optionally maintaining a desired circulation in said heat exchange unit to minimize scale, and filtering said water after use in said heat exchange operation to remove larger particles acted on by said magnetic field while permitting smaller particles to pass therethrough.

In the apparatus aspect of the invention, in a heat exchange operation utilizing water as the heat exchange medium, and wherein the system is at least a partially closed loop system, there is provided the improvement of a magnetic water treatment device mounted before the inlet to the heat exchange unit, said magnetic treatment device having a flow path for the water, magnetic means to generate magnetic flux lines, said flow path being such that the water passes through the magnetic flux at a relatively large angle between the directions of the magnetic flux lines and the water flow, means for directing said magnetically treated water into the heat exchange unit to maximize circulation thereof, pumping means to take water from the heat exchange operation, and filter means through which said water passes to remove particles of a desired size.

In greater detail, the method and apparatus of the present invention are designed to control the problems of scale and corrosion in a closed loop heat exchange system. The invention may be utilized in any number of different applications using a heat exchange operation including hot water tanks, boilers, chillers etc. One of the most common operations in the industrial and commercial world is the use of boilers and primary reference will be made herein to that application with the understanding that other heat exchange or like operations are susceptible to the practice of the invention.

The present invention can operate in any at least partially closed loop system. By this it is understood that the fluid, after undergoing the heat exchange operation, is recirculated in the system. Naturally, some systems may be hybrids of a closed loop system in that some discharge and/or loss of the fluid occurs and thus make-up fluid is added thereto. It is understood that the term "closed loop system" includes all such systems.

According to the present invention, the water undergoes a magnetic conditioning or treatment prior to entering into the boiler or heat exchange operation. The magnetic conditioning or treatment consists of providing a magnetic field having magnetic lines of flux at a desired density. The means for providing the magnetic field are well known to those skilled in the art and thus, permanent magnets may conveniently be utilized although it is also within the scope of the invention to utilize other means such as electro magnets. The water is exposed to the magnetic field as discussed hereinbelow.

Various parameters in the application of the magnetic field can be varied. For example, one may consider the number of magnetic fields generated, the flux density, the total magnetic flux lines, the flow rate of the water, and the angle at which the direction of flow of the water cuts the magnetic lines of flux.

Generally, from a commercial stand point, the flux density will range between 1200 gauss and 1500 gauss although this may be increased or decreased depending upon other operational parameters. The total number of magnetic lines of flux desirably would range between 4000 to 20,000 although, again, this may be varied depending upon the other parameters. Ideally, the intersection of the direction of flow of the water and the direction of magnetic flux lines would be 90°. Since this is often not achievable considering other operational parameters, it becomes desirable to at least have a large angle (greater than 60°) between the directions of the water flow and magnetic lines of flux.

The water or other fluid may be exposed to a single magnetic field or in the alternative, may be exposed to a plurality. In the preferred embodiment, the water will pass through at least two magnetic fields.

Following the magnetic treatment, the fluids containing the oriented particle are then fed to the heat exchange operation. As aforementioned, the heat exchange operation may be any conventional one and reference will be made herein to a typical boiler operation. Upon passing into the boiler, the water which has been magnetically treated has the normal tendency to crystallize. However, it has surprisingly been found that using the aforesaid magnetic treatment, one forms crystals which are different from the normally formed crystals. In this respect, the crystals tend to be somewhat larger in size and have an amorphous character.

Utilizing this fact, the water should be directed into the boiler in such a manner as to maintain a continuous circulation of the water therein. Thus, the circulation of the water in the boiler should be constant to maintain the amorphous particles in a type of colloidal suspension. Following the practice of the present invention, it has been found that any particles that do deposit in the boiler tend to be softer and easily removed. Thus, by providing a circulating pump and directing the water or fluid in a suitable manner to maintain circulation approximate the surfaces of the boiler, one is able to minimize the scaling.

The water, after being utilized in the heat exchange operation, is normally condensed and returned to the boiler. According to the practice of the present invention, prior to re-entering the magnetic conditioning device, the water is subjected to a filtering step to remove larger particles therefrom. It has been found that the magnetic conditioning, as aforementioned, forms relatively large amorphous particles and these may easily be removed by a desired mechanical filtering step. The filter size should be selected according to the particular application. Generally, it has been found that removing particles having a size larger than at least 25 microns and preferably 5 microns, achieves the desired result of minimizing scale and corrosion.

As aforementioned, it is one of the features of the present invention that a continuous circulation is provided. To this end, suitable pump means will be provided to pump the fluid in the manner described above. These pump means will be sized to be suitable to make up for any pressure drop across the magnetic treatment device and filtering device.

It has surprisingly been found that following the above procedure overcomes both the corrosion and scale problems in a typical boiler application. Blow downs of the boilers are avoided for a longer period of time.

The present invention is designed to be utilized with "hard water". Although there is no clear definition of what constitutes hard water, generally three grains of 50 ppm and more would be considered water which would benefit from the practice of the present invention. Naturally, soft waters does not present a scale problem and therefore the practice of the present invention would not be of the same benefit.

The constitutents of hard water will, of course vary from one location to another with most hard waters containing dissolved calcium magnesium salts. As previously mentioned scale build-up is the result when the dissolved salts precipitate and deposit. The scales are generally present as carbonate, bi carbonates, sulfates and chlorides. One other material which is sometimes present is silica which presents a problem since it acts as an excelling binding agent for other impurities and results in hard and very adherent scales.

BRIEF DESCRIPTION OF THE FIGURE

Having thus generally described the invention, reference will be made to the accompany drawings illustrating embodiments thereof, in which.

DETAILED DESCRIPTION OF THE INVENTION

Figure 1:
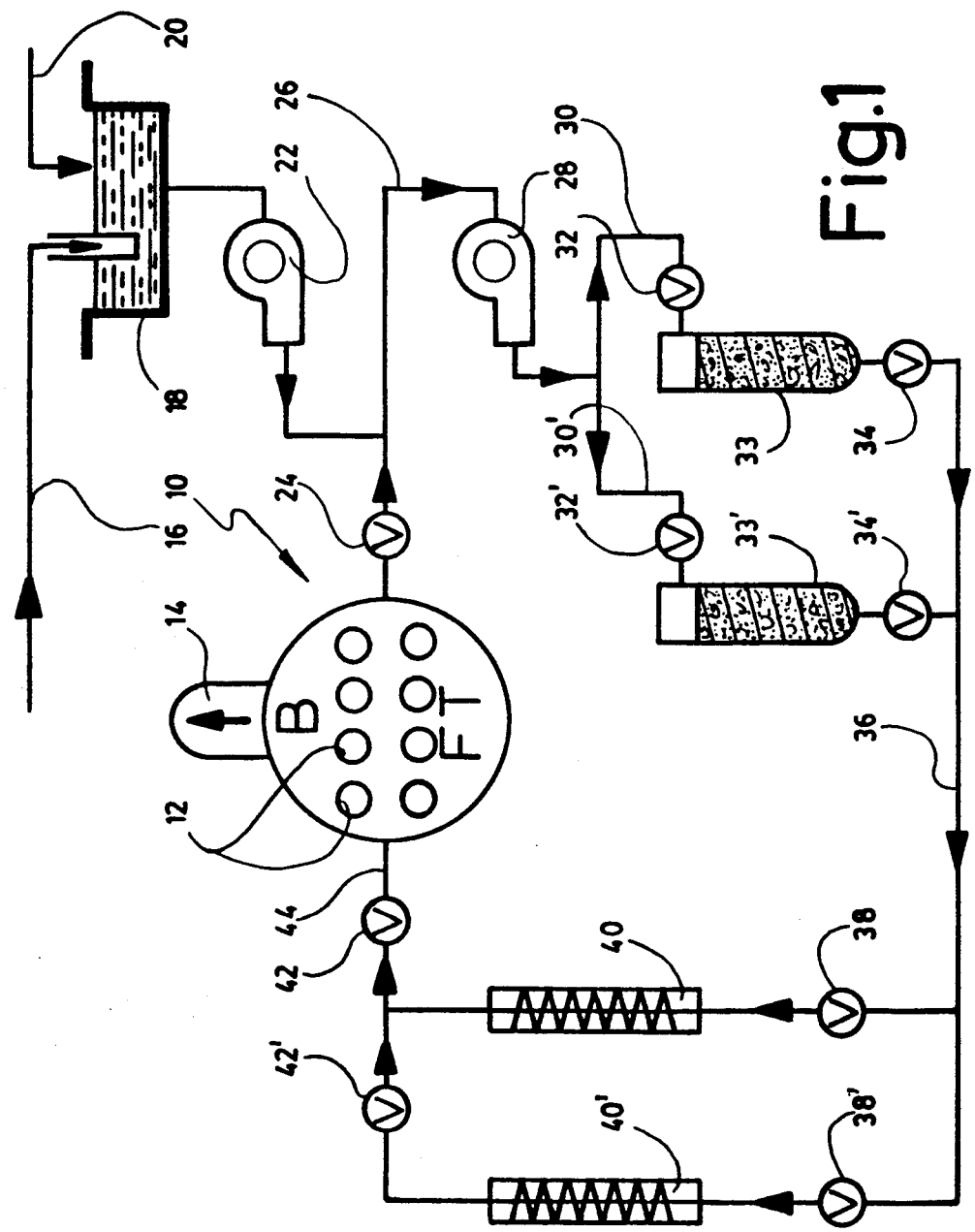
FIG. 1 is a schematic diagram illustrating an embodiment of the present invention.

Referring to the drawings in greater detail, there is provided a boiler installation generally designated by reference numeral 10. Boiler 10 is of any conventional type and includes a plurality of heating means 12 therein. Electric, oil or gas heating may be utilized. Following heating, the liquid or vapour, as the case may be, exits through outlet 14 to be utilized in a heat transfer operation (not shown).

Following the heat transfer operation, the thus cooled liquid or vapour returns through line 16 to a reservoir 18 where optionally, in the case of vapours, it may undergo a condensing operation. As is conventional, a feed line 20 may be used to feed new water into the reservoir as required.

Exiting from the reservoir 18, a feed pump 22 takes the liquid and feeds it back to the boiler 10 with a valve member 24 being adapted to control the feed thereof.

The above arrangement is that of a conventional boiler or heat exchange system and it is to this system that the present invention can be applied.

As shown in FIG. 1, a second feed pipe 26 takes the fluid from pump 22 and a continuously operating circulating pump 22 then feeds the fluid in a continuous manner for reasons which will be discussed hereinbelow. This liquid is fed through a line 30 having a valve 32 thereon to a filter member 33. Filter member 33 is designed to allow certain size particles therethrough as will be discussed hereinbelow. Valve members 32 and 34 at the inlet and outlet respectively can be utilized to control the flow of the liquid.

In a preferred embodiment, a second filter member 33' leading from line 30' and having valves 32' and 34' associated therewith is provided. Filter member 33' may be utilized to permit continuous operation of the system when filter member 33 is being serviced.

From filter member 33 (or 33'), the liquid passes through line 36 to a magnetic conditioning device generally designated by reference numeral 40. Valves 38 and 42 are associated therewith. As was the case with filter 33, an optional second magnetic conditioning device 40' may be provided in case of service requirements for magnetic conditioning device 40.

In operation, the fluid is passed through magnetic conditioning device 40 in a manner such that the direction of the flow of fluid cuts the magnetic flux lines created by the magnetic field at an angle with respect thereto. It is the angle of the flow of water with respect to the flux lines which permits the most efficient operation of the present invention.

Magnetic conditioning devices 40 and 40' may be selected from among those devices wherein the water is passed through magnetic lines of flux at the desired angle as previously discussed. A particularly suitable type of magnetic conditioning devices which may be utilized in the present invention are those marketed under the trade name "Hako" including models HR-1, 8PP, 101 75. These particular magnetic conditioning devices are suitable for relatively high temperature operation and utilize an interior core having one or more magnetic fields generated by permanent magnets along with a helical path surrounding the outside of the core through which the water passes thus cutting the magnetic lines of force at a relatively large angle.

The mechanical filtering operation is designed to remove particles having a certain size. The mechanical filter must be designed to withstand the typical temperature and pressure operations involved in both systems. By removing large particles while allowing the smaller particles to remain in suspension, and ensuring that they do not deposit on the surfaces of the boiler, a desired pH balance will be achieved.

It will be understood that the above described embodiment is for purposes of illustration only and that changes and modifications may be made thereto without departing from the spirit and scope of the invention.

What is claimed is:

1. A method for the treatment of water within a closed loop transfer system wherein said water is heated, subsequently used in a heat transfer operation, and then returned for reheating, the improvement comprising the steps of:
   a. generating a magnetic field having magnetic lines of flux extending in a certain direction
   b. passing said water from said heat transfer operation through said magnetic field in a direction to cut said lines of flux such that the direction of water flow and the direction of the flux lines intersect at an angle, subsequently directing the water passed through said magnetic field to said heating step and then to said heat transfer operation, and mechanically filtering said water following said heat transfer operation and prior to again subjecting said water to said magnetic field, to thereby remove some larger particles while permitting sufficient smaller particles to pass therethrough to maintain a desired pH in the system.

2. The method of claim 1 wherein the direction of water flow and the direction of the flux lines intersect at an angle of between 60° and 90°.

3. The method of claim 2 wherein said step of generating a magnetic field having magnetic lines of flux comprises the step of generating a magnetic field of between 1200 and 1500 gauss.

4. The method of claim 2 wherein said water is passed through at least two separate magnetic fields prior to entering said heat transfer operation.

5. The method of claim 2 wherein the step of mechanically filtering said water following said heat transfer operation comprises the step of filtering said water to remove particles larger than 25 microns.

6. The method of claim 2 wherein the step of mechanically filtering said water following said heat transfer operation comprises the step of filtering said water to remove particles larger than 5 microns.

7. The method of claim 1 further including the step of maintaining a continuous circulation of said water through said magnetic field and said heat transfer operation, and directing the water flow in said heat transfer operation so as to maintain water circulation proximate heating surfaces of said heat step to thereby minimize scale formation on said heating surfaces.

8. In a method for the treatment of water having impurities therein with a closed loop transfer system wherein said water is heated, subsequently used in a heat transfer operation, and then returned for reheating, the improvement comprising the steps of creating a magnetic field having magnetic lines of flux extending in a certain direction, passing said water from said heating step through said magnetic field in a direction such that the direction of flow of the water cuts the direction of said lines of flux at an angle with respect thereto, and maintaining said water in the magnetic field for a period of time sufficient for particles formed from said impurities to have an orientation imparted thereto, subsequently directing the water passed through said magnetic field to said heating step and then to said heat transfer operation, and then mechanical filtering said water prior to again subjecting said water to said magnetic field to remove at least a portion of the particles formed by application of said magnetic field, and continuously circulating said water through said heating step.

9. In a closed loop heat exchange system using water as a heat exchange medium including heating means, heat exchange means, an inlet to said heat exchange means being connected to an outlet of said heating means, outlet means from said heat exchange means connected by a conduit to an inlet of said heating means to thereby form a closed loop, the improvement comprising magnetic treatment means connected in said conduit between said outlet for said heat exchange means and said inlet to said heating means, said magnetic treatment means comprising magnetic field generating means to create magnetic lines of flux and means for directing water in a direction through said lines of flux to thereby cut said magnetic lines of flux at an angle, means for continuously circulating said water, through said closed loop and filter means in said conduit interposed between said outlet of said heat exchange means and said magnetic treatment means, said filtering means being sized to permit sufficient smaller particles to pas therethrough to thereby maintain a desired pH of the heat exchange medium.

10. The improvement of claim 9 wherein said filtering means is sized to permit particles smaller than 5 microns to pass therethrough.

11. The improvement of claim 9 wherein said magnetic treatment means comprises at least two magnetic treatment means connected in parallel in said conduit.

* * * * *